Aug. 22, 1961 L. R. JACOBSEN 2,997,674

LOGARITHMIC SIGNAL LIMITING COUPLING CIRCUIT OR THE LIKE

Filed Feb. 25, 1957

LANCE R. JACOBSEN
*INVENTOR.*

BY [signature]

HIS ATTORNEY 2,997,674
Patented Aug. 22, 1961

2,997,674

LOGARITHMIC SIGNAL LIMITING COUPLING CIRCUIT OR THE LIKE

Lance R. Jacobsen, Lynwood, Calif., assignor to Hoffman Electronics Corporation, a corporation of California Filed Feb. 25, 1957, Ser. No. 642,027
2 Claims. (Cl. 333—77)

This invention relates to coupling circuits and, more particularly, relates to means associated with link coupling between resonant output and input circuits of translating devices whereby the signal energy coupling between the output and input circuits may be automatically varied in response to the amplitude of signals so as to maintain substantially constant gain from the over-all translating section.

The prior art demonstrates numerous automatic gain control circuits and other means for maintaining constant-amplitude output regardless of amplitude differences amongst a plurality of input signals. However, prior art amplifiers and their associated circuits have numerous disadvantages, particularly with reference to intermediate frequency (I-F) amplifiers. For example, most I-F amplifiers cannot translate signals with greatly differing amplitudes with equal resolution. Similarly, most amplifiers do not have sufficient resolution to translate a low-level signal closely adjacent to a high-level signal without having extremely selective circuits or else complicated circuitry for individual response for the different levels of signals. Some devices have been able to achieve variable gain characteristics at the cost of producing random noise, which would appear as "grass" with the signals being displayed on a cathode ray oscilloscope, and/or causing distortion so that pulse information cannot be immediately identified when intermixed with other types of modulation on a carrier. Inverse feedback and other degenerative circuits are unsatisfactory because of the inherent low gain of I-F amplifiers as well as the improper phase relationships over a wide bandwidth. Naturally, manual gain controls are unsatisfactory because they are not capable of instantaneous adjustment of the inherent gain to adapt to the magnitudes of all received signals.

Therefore, it is one of the objects of the present invention to provide a resonant link coupling circuit adapted automatically to reduce the overall gain of an amplifier in response to increases in amplitudes of greatly varying signals.

It is a further object to provide a resonant link coupling circuit that will translate signals with amplitudes ranging from minimum detectable level to signal amplitudes of a volt or more with substantially equal resolution, whether the low-level signals are separated from or closely adjacent to the high-level signals.

An important object is to provide an amplifier with a link coupling circuit having means for logarithmic dissipation of signal energy in accordance with the magnitude thereof.

Another object is the provision of an I-F coupling circuit capable of being instantaneously responsive to random noise and pulse signals in close successive relationship to each other.

Another object is to provide an I-F coupling circuit capable of coupling pulse information intermixed with other types of modulation on a carrier without variable gain distortion.

A further object is the provision of an I-F coupling circuit adapted to perform the above objects without diminishing the over-all gain of the I-F amplifier below relatively high signal levels.

A still further object is to provide an I-F coupling circuit having a logarithmic attenuation characteristic capable of adjustment to permit its operation for different types of associated circuits.

A still further object is the provision of an amplifier with a coupling circuit whereby the resolution or bandwidth of the over-all amplifier may be increased or decreased without affecting either the center frequency or shape factor.

An additional object is to provide a coupling circuit whereby a broad bandpass can be obtained with substantially flat frequency response and a constant amplitude level may be obtained independent of input signal levels.

According to the present invention, first and second translating devices are provided with resonant output and input circuits, respectively, and resonant link coupling means therebetween for intercoupling signals from the first to the second device and responsive to the signals for dissipating a portion thereof. More particularly, dissipating means responsive to a predetermined amplitude of the signals is coupled to the resonant link coupling circuit at the input end thereof so that only appropriately reduced amounts of signal energy will be available for coupling from the output end of the link coupling circuit to the second translating device. In a preferred embodiment of the present invention, the output and input circuits are shielded so as to be electromagnetically isolated with respect to each other, thereby assuring complete dissipation of signal energy above a predetermined magnitude as determined by the dissipating means. Additional advantages may be obtained, according to the present invention, by staggering the coupling relationships of the inductor elements of the output and input circuits so that a broad bandpass can be obtained with substantially flat frequency response and, in addition, a constant amplitude level may be maintained independent of input signal levels.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
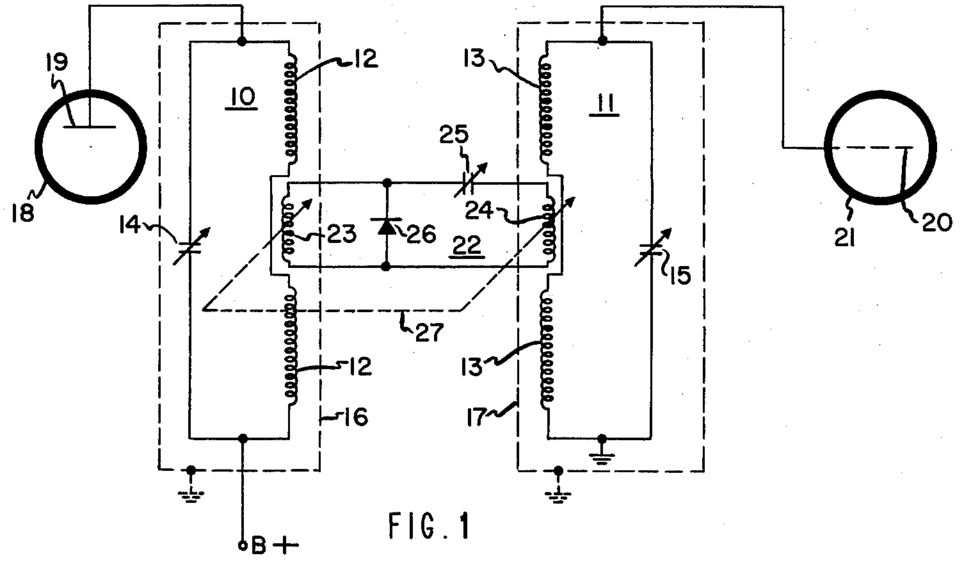
FIGURE 1 is a schematic diagram of one embodiment of the present invention.

As seen in FIGURE 1, the present invention contemplates the use of two resonant circuits 10 and 11 being the output and input circuits, respectively, of successive translating devices. Resonant circuits 10 and 11 may be parallel resonant, as shown, and include inductors 12 and 13, respectively, and tuning or trimmer capacitors 14 and 15, respectively. The inductors 12 and 13 may be shielded from each other to avoid direct electromagnetic coupling therebetween. The entire output and input circuits 10 and 11 are shown as being shielded from each other by means of shields 16 and 17, respectively, for the purposes of convenience of construction and in order to keep the leads of the capacitors to their respective inductances short and, consequently, to avoid stray reactance. Output circuit 10 develops the output signal of a translating device which includes tube 18 and is here shown as the plate load of said tube, being connected to the plate 19 thereof. Tube 18 may be part of any stage of amplification, or a mixer stage, which will be more fully explained hereinafter. The plate 19 is supplied with a positive potential from the terminal marked B+ in the well known manner. Input circuit 11 is effectively connected to a grid 20 of tube 21, tube 21 being part of an I-F amplifier stage or other translating device adapted to utilize the translated signal. The signal developed by output circuit 10 is coupled to input circuit 11 by means of a link, indicated generally at 22. The link coupling circuit 22 includes inductors 23 and 24 in mutually inductive coupling relationship with respect to inductors 12 and 13, respectively, a variable tuning capacitor 25 for resonating the link coupling circuit 22, and dissipative element 26 effectively coupled across inductor 23. In the preferred embodiment illustrated, the dissipative element 26 is shown to be a unidirectional valve, the most common being a diode, which may be either the crystal or vacuum tube type.

The coupling relationships between inductors 12 and 23 and between inductors 13 and 24 may be mechanically ganged as by linkage 27 for selectively increasing or decreasing the mutual inductance. Thus, assuming over-coupling as the initial or median condition for both pairs of inductors, variation in the adjustment of gang linkage 27 will cause one pair of inductors to be over-coupled even more and the other pair of inductors to be more nearly critically coupled, although still over-coupled, whereby the bandwidth will be increased, as will be more fully explained hereinafter.

Figure 2:
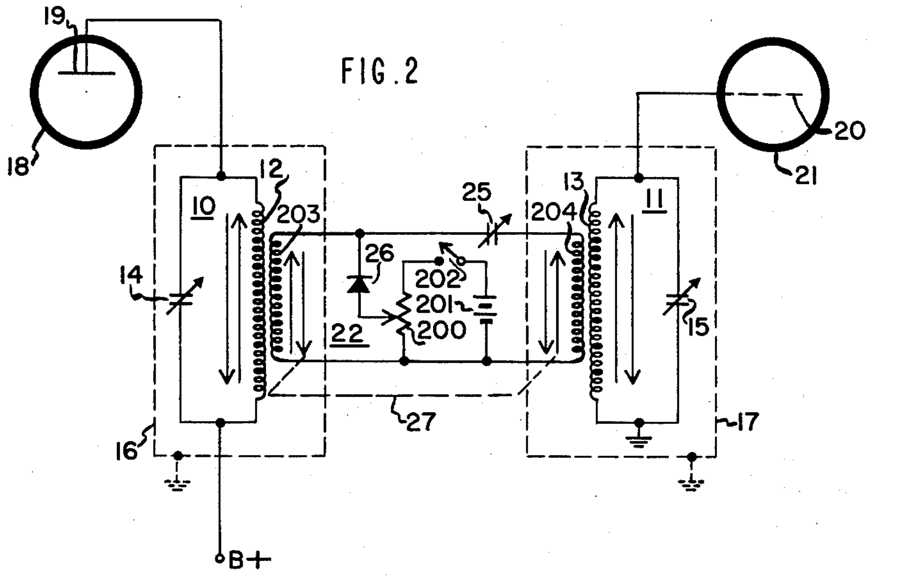
FIGURE 2 is a schematic diagram of another embodiment of the invention.

Referring to FIGURE 2, there has been added variable means for establishing an amplitude level of operation of the dissipative element 26, such means including potentiometer 200, D.C. voltage source 201, and switch 202. In addition, an alternative method of increasing the bandwidth has been illustrated wherein coupling inductors 203 and 204 have their tuning slugs ganged through linkage 27 in opposition to each other so that the inductance of one inductor will be increased while the inductance of the other inductor is decreased.

The function and operation of the combined translating means and link coupling circuit 22 may be described as based upon the premise that when resonant circuits 10 and 11 are tightly coupled by the resonant circuit 22 and the impedance of the resonant coupling 22 is lowered, the coupling between the resonant circuits 10 and 11 will be reduced. With particular reference to FIGURE 1, the element 26 appears initially as a high value of resistance to inductor 23 which permits the resonant coupling circuit 22 to maintain a high value of impedance for low amplitude signals and, further, assures maximum efficiency of energy transfer. As the signal level is increased, the element 26 starts to conduct current and its resistance lessens, thereby lowering the over-all impedance presented by the coupling circuit 22 to the output signal presented by output circuit 10. This reduction of the over-all impedance of the coupling circuit 22 reduces the energy coupled by circuit 22 from the inductor 12 to the inductor 13. In addition, as the element 26 conducts, it dissipates current through inductor 23 which, in turn, increases the loading on the inductor 12, and lowers the circuit Q of inductor 12. This has the desired effect of causing an additional reduction of the energy transfer from the inductor 12 to the inductor 23.

Another factor in support of the reduced coupling effect is the fact that, as element 26 conducts, the transfer impedance from the inductor 23 to inductor 24 is reduced, causing the energy transfer from inductor 24 to inductor 13 to be reduced. Because of the lowered impedance transfer from the inductor 24 to the inductor 13, the circuit Q of the inductor 13 is raised, thereby tending to maintain the shape factor of the response curve which would otherwise be altered by the decreased circuit Q of the inductor 12, as described above.

The limiting action of the element 26 will only take effect when the amplitude of the signal from the output circuit 10 is sufficient to overcome the conduction threshold level of the element. If dissipative element 26 is a vacuum tube diode, the threshold level may be relatively high as compared to a crystal semiconductor. Adjustment of the effective threshold level may be obtained by means of potentiometer 200, with switch 202 either open or closed. With switch 202 open, potentiometer 200 operates during the conduction of element 26 to minimize the voltage drop across that element, thereby functioning as a current limited to prevent dissipation, until the signal rises to a value sufficient to overcome the biasing effect. With switch 202 closed, D.C. voltage source 201 provides a biasing potential to dissipative element 26, thereby raising the conduction threshold level. The setting of potentiometer 200 may be varied to set that level. If element 26 is a semiconductor, it may be operated either on its forward or back resistance. When element 26 is operating on its back resistance, potentiometer 200 may be set so as to pick off a D.C. voltage below the avalanche breakdown voltage of the semiconductor, and the difference between the picked voltage and the avalanche breakdown voltage will establish that magnitude of output signal from the output circuit 10 above which the signal will be dissipated.

Referring again to the methods of increasing frequency response bandwidth, the split coil construction of inductors 12 and 13 of FIGURE 1 and the mechanical movement thereinbetween of inductors 23 and 24, respectively, are well known in the art. Similarly, the slug tuning construction of FIGURE 2 is well known in the art. In each case, and disregarding the effect of the dissipative element 26, the frequency response curves on both the output and input sides of coupling circuit 22 will have peaks slightly below and above the nominal resonant frequency. Staggering the peaks of the response curves is accomplished, in the first case, by variation of the mutual inductance and, in the second case, by variation of the inherent inductance. As is well known, staggered tuning or staggered coupling will result in an increased bandwidth of the over-all frequency response curve, but there will be amplitude variations within that bandwidth. However, the effect of element 26 is to flatten the response curve throughout the increased frequency band of the over-all frequency response curve, thus permitting increased frequency bandwidth operation without distortion or variable gain while maintaining the center frequency and shape factor.

The coupling circuit of the present invention may be utilized in successive stages. When used for the I-F amplifiers, it should preferably follow the mixer stage to prevent blocking of the first I-F stage upon occurrence of high amplitude signals. The threshold level may be raised for succeeding stages of amplification.

It should be noted that the preferred embodiment of the present invention includes electromagnetic shields 16 and 17, thus preventing direct electromagnetic interaction between the fields around inductors 12 and 23 (or 203) with the fields around inductors 13 and 24 (or 204). Of course, either shield alone may be sufficient, or other types of shielding known in the art may be substituted. In some applications of the present invention, shields may be eliminated entirely. However, if the output and input circuits are not electromagnetically isolated from their respective coupling inductors, the signal limiting effect of element 26 will not be as pronounced. With shielding, all of the output signal of output circuit 10 above a determinable magnitude will be dissipated, depending upon the threshold level of element 26. Without shielding, only a portion of the signal above that magnitude will be dissipated since some of the signal will be directly electromagnetically coupled from inductors 12 and 23 (or 203) to inductors 13 and 24 (or 204).

For the purpose of definition, reference to element 26 should be construed to mean either the single element illustrated or two elements. In the latter case, two elements are connected effectively in parallel to each other across the coupling circuit, but in phase opposition to each other. Experiments have shown that such use of two elements results in an over-all output/input response curve more closely following a theoretical logarithmic response curve than is the case with a single element.

Although element 26 has been described as either a semiconductor or vacuum tube diode, other dissipative elements may be used which have the desired characteristic of logarithmic current response to voltage variations.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A variable bandwidth coupling circuit for automatically regulating both the effective gain and the coupling coefficient between first and second signal translating means each having a tuned resonant circuit including an inductive winding and a variable capacitance, comprising: resonant variably tuned coupling means having a pair of inductors respectively in mutual inductive coupling relationship with the tuned inductive coupling windings of said first and second circuits to transmit signal energy from said first to said second signal translating means, means for varying the bandwidth of said coupling circuit, a link circuit tightly coupled with said inductors in series relationship for alternating current flow, a voltage-sensitive nonlinear diode device connected in shunt with said link circuit to resistively dissipate a variable portion of the energy transferred to said link circuit from said first signal translating means, whereby as said signal energy level rises in said first signal translating means the shunt impedance of said link circuit is lowered to reduce the energy coupled from said first to said second signal translating means, and the coupling coefficient of said first signal translating resonant circuit is controlled automatically thereby to produce a logarithmic input-output relationship combined with a constant response-curve shape factor over a range of bandwidth variations.

2. A link coupling circuit as set forth in claim 1 in which said link circuit also includes a variable capacitor in series with said variably tuned resonant coupling inductors.

References Cited in the file of this patent

UNITED STATES PATENTS

| | | |
|---|---|---|
| 2,177,050 | Bartels | Oct. 24, 1939 |
| 2,248,466 | Roosenstein | July 8, 1941 |
| 2,262,707 | Farrington | Nov. 11, 1941 |
| 2,285,044 | Morris | June 2, 1942 |
| 2,735,902 | Vose | Feb. 21, 1956 |
| 2,774,866 | Burger | Dec. 18, 1956 |

FOREIGN PATENTS

| | | |
|---|---|---|
| 626,129 | Great Britain | July 11, 1949 |

OTHER REFERENCES

Terman: Electronic and Radio Engineering, pages 418–421, McGraw-Hill Book Co., 1955.